(12) United States Patent
Junio Da Cruz et al.

(10) Patent No.: US 10,992,470 B2
(45) Date of Patent: Apr. 27, 2021

(54) SYSTEM AND METHOD FOR EFFICIENT AND SECURE IMPLEMENTATION OF LS-DESIGNS

(71) Applicants: LG Electronics Inc., Seoul (KR); UNICAMP, São Paulo (BR)

(72) Inventors: Rafael Junio Da Cruz, São Paulo (BR); Diego F. Aranha, São Paulo (BR); Julio cesar Lopez Hernandez, São Paulo (BR)

(73) Assignees: LG Electronics, Inc., Seoul (KR); UNICAMP, Sao Paulo (BR)

( * ) Notice: Subject to any disclaimer, the term of this patent is extended or adjusted under 35 U.S.C. 154(b) by 232 days.

(21) Appl. No.: 16/100,000

(22) PCT Filed: May 12, 2017

(86) PCT No.: PCT/KR2017/004967
§ 371 (c)(1),
(2) Date: Nov. 8, 2018

(87) PCT Pub. No.: WO2017/196136
PCT Pub. Date: Nov. 16, 2017

(65) Prior Publication Data
US 2019/0140821 A1    May 9, 2019

Related U.S. Application Data

(60) Provisional application No. 62/335,649, filed on May 12, 2016.

(51) Int. Cl.
*G06F 21/00* (2013.01)
*H04L 9/30* (2006.01)
(Continued)

(52) U.S. Cl.
CPC ............ *H04L 9/3066* (2013.01); *G06F 17/16* (2013.01); *G09C 1/00* (2013.01); *H04L 9/002* (2013.01);
(Continued)

(58) Field of Classification Search
CPC ..... H04L 9/002; H04L 9/0618; H04L 9/3066; H04L 63/04; H04L 63/0428; H04L 63/0435; G06F 17/16; G09C 1/00
See application file for complete search history.

(56) References Cited

U.S. PATENT DOCUMENTS

2010/0067687 A1   3/2010   Chandramouli et al.
2012/0076294 A1   3/2012   Koo et al.
(Continued)

OTHER PUBLICATIONS

Vincente Grosso et al., "LS-Designs: Bitslice Encryption for Efficient Masked Software Implementations," International Workshop on Fast Software Encryption, Mar. 3-5, 2014, https://hal.inria.fr/hal-01093491/document, see Sections 2-4.4.
(Continued)

*Primary Examiner* — Jeffrey C Pwu
*Assistant Examiner* — Thong P Truong
(74) *Attorney, Agent, or Firm* — Duane Morris LLP (57) ABSTRACT

The invention provides implementations of the block cipher in resource-constrained ARM devices that may be applied to both 32-bit and 64-bit versions of side-channel resistant and vectorized code and provides improves both efficiency and compactness by using of algorithmic techniques and features specific to a target platform. Specifically, an unprotected 32-bit implementation improves speed while reducing code size and a vectorized implementation improves performance and speed the implementation of block cipher.

11 Claims, 4 Drawing Sheets

(51) Int. Cl.
*H04L 29/06* (2006.01)
*G06F 17/16* (2006.01)
*G09C 1/00* (2006.01)
*H04L 9/00* (2006.01)
*H04L 9/06* (2006.01)

(52) U.S. Cl.
CPC ............ *H04L 9/0618* (2013.01); *H04L 63/04* (2013.01); *H04L 63/0428* (2013.01); *H04L 63/0435* (2013.01); *H04L 2209/04* (2013.01); *H04L 2209/122* (2013.01); *H04L 2209/125* (2013.01)

(56) References Cited

U.S. PATENT DOCUMENTS

| | | | |
|---|---|---|---|
| 2012/0128153 A1* | 5/2012 | Golic | H04L 9/065 380/45 |
| 2015/0229470 A1* | 8/2015 | Lotspiech | G09C 1/00 380/277 |
| 2016/0087790 A1* | 3/2016 | Karame | H04L 9/0618 380/28 |
| 2016/0105276 A1 | 4/2016 | Brumley et al. | |

OTHER PUBLICATIONS

Daniel Dinu et al., "Triathlon of Lightweight Block Ciphers for the Internet of Things," NIST Workshop on Lightweight Cryptography, Jul. 20-21, 2015, http://csrc.nist.gov/groups/ST/lwc-workshop2015/papers/session7-grobschadlpaper.pdf, see Sections 2-5.
International Search Report and Written Opinion—PCT/KR2017/004967—ISA/KR—dated Aug. 9, 2017.

\* cited by examiner

[Fig. 1]

$$m = \bigoplus_{i=0}^{d} m_i = m_0 \oplus m_1 \oplus \ldots \oplus m_d$$

where each mi is a shared secret and all shared secrets together form a masked secret

[Fig. 2]

1. Every linear operation over a masked secret $m$ is equivalent to applying the same operation over shared secrets of $m$:

$$L(m) = L(m_0 \oplus m_1 \oplus \ldots \oplus m_d) = L(m_0) \oplus L(m_1) \oplus \ldots \oplus L(m_d)$$

2. A NOT operation over a masked secret can be seen as:

$$\neg m \equiv \neg m_0 \oplus m_1 \oplus \ldots \oplus m_d$$

3. A XOR operation between masked secrets $a = \bigoplus_{i=0}^{d} a_i$ and $b = \bigoplus_{i=0}^{d} b_i$ can be seen as:

$$a \oplus b \equiv \bigoplus_{i=0}^{d} a_i \oplus \bigoplus_{i=0}^{d} b_i = \bigoplus_{i=0}^{d} (a_i \oplus b_i)$$

4. An AND operation between two masked secrets $a = \bigoplus_{i=0}^{d} a_i$ and $b = \bigoplus_{i=0}^{d} b_i$ is more complicated and can be seen in Algorithm 1.

---

Algorithm 1 Non linear operation AND performed on two masked secrets $a$ and $b$

Require: Shares $(a_i)$ and $(b_i)$ satisfying $\bigoplus_{i=0}^{d} a_i = a$ and $\bigoplus_{i=0}^{d} b_i = b$.
Ensure: Shares $(c_i)$ satisfying $\bigoplus_{i=0}^{d} c_i = a \wedge b$
 1: for $i$ from 0 to $d$ do
 2:     $r_{i,i} \leftarrow 0$;
 3:     for $j$ from $i+1$ to $d$ do
 4:        $r_{i,j} \leftarrow random()$;
 5:        $r_{j,i} \leftarrow (r_{i,j} \oplus (a_i \wedge b_j)) \oplus (a_j \wedge b_i)$;
 6:     end for
 7: end for
 8: for $i$ from 0 to $d$ do
 9:     $c_i \leftarrow a_i \wedge b_i$;
10:     for $j$ from 0 to $d$ do
11:        $c_i \leftarrow c_i \oplus r_{i,j}$;
12:     end for
13: end for

[Fig. 3]

Algorithm 2 LS-Design construction encrypting plaintext $P$ with key $K$.

1:   $x \leftarrow P \oplus K$       ▷ $x$ represents an $s \times l$-bit matrix
2:   for $0 \leq r < N_r$ do
3:      for $0 \leq i < l$ do       ▷ S-box layer
4:         $x[i, \star] = S[x[i, \star]]$
5:      end for
6:      for $0 \leq j < s$ do       ▷ L-box layer
7:         $x[\star, j] = L[x[\star, j]]$
8:      end for
9:      $x \leftarrow x \oplus K \oplus C(r)$       ▷ Key and round constant addition
10: end for
11: return x

[Fig. 4]

Algorithm 3 MISTY 3/5 bits S-boxes on state $x = \{X_0, X_1, \ldots, X_7\}$

1:  ▷ S5
2:  $X_2 \leftarrow X_2 \oplus (X_0 \wedge X_1)$;
3:  $X_1 \leftarrow X_1 \oplus X_2$;
4:  $X_3 \leftarrow X_3 \oplus (X_0 \wedge X_4)$;
5:  $X_2 \leftarrow X_2 \oplus X_3$;
6:  $X_0 \leftarrow X_0 \oplus (X_1 \wedge X_3)$;
7:  $X_4 \leftarrow X_4 \oplus X_1$;
8:  $X_1 \leftarrow X_1 \oplus (X_2 \wedge X_4)$;
9:  $X_1 \leftarrow X_1 \oplus X_0$;
10: ▷ Extend-Xor
11: $X_0 \leftarrow X_0 \oplus X_5$;
12: $X_1 \leftarrow X_1 \oplus X_6$;
13: $X_2 \leftarrow X_2 \oplus X_7$;
14: ▷ Key
15: $X_3 \leftarrow \neg X_3$;
16: $X_4 \leftarrow \neg X_4$;
17: ▷ S3: 3-bit Keccak S-box 18: $t_0 \leftarrow X_5, t_1 \leftarrow X_6, t_2 \leftarrow X_7$;
19: $X_5 \leftarrow X_5 \oplus ((\neg t_1) \wedge t_2)$;
20: $X_6 \leftarrow X_6 \oplus ((\neg t_2) \wedge t_0)$;
21: $X_7 \leftarrow X_7 \oplus ((\neg t_0) \wedge t_1)$;
22: ▷ Truncate-Xor
23: $X_5 \leftarrow X_5 \oplus X_0$;
24: $X_6 \leftarrow X_6 \oplus X_1$;
25: $X_7 \leftarrow X_7 \oplus X_2$;
26: ▷ S5
27: $X_2 \leftarrow X_2 \oplus (X_0 \wedge X_1)$;
28: $X_1 \leftarrow X_1 \oplus X_2$;
29: $X_3 \leftarrow X_3 \oplus (X_0 \wedge X_4)$;
30: $X_2 \leftarrow X_2 \oplus X_3$;
31: $X_0 \leftarrow X_0 \oplus (X_1 \wedge X_3)$;
32: $X_4 \leftarrow X_4 \oplus X_1$;
33: $X_1 \leftarrow X_1 \oplus (X_2 \wedge X_4)$;
34: $X_1 \leftarrow X_1 \oplus X_0$;

[Fig. 5]

```
typedef union {
    uint32_t u32;
    uint16_t u16[2];
} U32_t;
```

[Fig. 6]

```
/* Unprotected L-box version */
state[j].u16[0] = LBoxH[state[j].u16[0]>>8] ^
                  LBoxL[state[j].u16[0] & 0xff];
state[j].u16[1] = LBoxH[state[j].u16[1]>>8] ^
                  LBoxL[state[j].u16[1] & 0xff];
```

[Fig. 7]

```
static inline uint32_t ProdLBox(uint32_t x, uint32_t y, uint8_t s) {
    x &= y;
    x ^= x >> 8;
    x ^= x >> 4;
    x ^= x >> 2;
    x ^= x >> 1;
    return (x & 0x00010001) << s;
}
```

[Fig. 8]

```
for(j=0; j < 4; j++)
    state[j].u32 ^= key_32[j];
```

[Fig. 9]

```
uint32_t ProdLBox(uint32_t x, uint32_t y) {
    x &= y;
    x ^= x >> 8;
    x ^= x >> 4;
    x ^= x >> 2;
    x ^= x >> 1;
    return (x & 0x00010001);
}
```

[Fig. 10]

SYSTEM AND METHOD FOR EFFICIENT AND SECURE IMPLEMENTATION OF LS-DESIGNS

TECHNICAL FIELD

The present invention relates to Cryptography, and specifically, to Efficient and Secure Implementation of LS-Designs.

BACKGROUND ART

Lightweight cryptography for embedded systems has been a very active field of research in the last decades has recently gained renewed interest with the emergence of the Internet of Things (IoT). Cryptographic primitives may mitigate or solve several problems faced by connected devices collecting and exchanging sensitive information through an open network.

Many innovative encryption algorithms have been proposed to maximize performance in resource-constrained devices and to provide lighter alternatives to AES without compromising security, such as the NSA-designed SPECK and SIMON block cipher families, the PRINCE block cipher, and the Low-power Encryption Algorithm (LEA). These lightweight designs follow multiple constructions, such as Feistel, Substitution-Permutation and ARX networks, and involve distinct trade-offs with regard to efficiency, compactness and resistance to different attacks. While these algorithms are still considered secure according to the latest cryptanalytic results, their implementations may be susceptible to attacks based on information leakage.

Side-channel analysis is a growing and important issue for security in cryptography, specifically in embedded devices. These attacks are based on information leaked during computation through side channels such as execution time, energy consumption, acoustic and electromagnetic emanations. When successful, these attacks facilitate identification and recovery of secret data from observations captured from implementations of cryptography, thereby overcoming the much higher computational cost of cryptanalysis or exhaustive search in the key space. Secret data may be a long-term private key, an ephemeral session key or partial information about the internal state of a primitive, including bits of the plaintext or round keys.

Such attacks may be based on a small number of observations, such as Branch Prediction or Simple Power Attacks (SPA), or require traces from many consecutive observations as in Differential Power Attacks (DPA). Resistance to side-channel attacks has been considered an additional security requirement for low-cost ciphers because the lightweight devices implementing them may be physically accessible to the attacker. Algorithms with side-channel resistance guarantees embedded in the construction itself have brought attention to ciphers such as PICARO and Fantomas.

The LS-Design paradigm was created with side-channel resistance in mind because it allows the designer to construct lightweight algorithms for efficient implementation of side-channel countermeasures. LS-Design ciphers typically combine a bitsliced substitution layer with a linear diffusion layer implemented with precomputed tables, both amenable to masking techniques with controlled overhead.

Masking schemes were initially proposed in the context of protecting circuits against probing and were later extended to much more complex operations, even achieving provable security guarantees. Masked implementations allow the entire computation to be performed over shared secrets, thereby de-correlating any potential side-channel leakages from the actual data being encrypted or the real cryptographic keys. Therefore, masking can be seen as a collection of perturbation techniques to introduce external random noise in the encryption or decryption processes, thereby acting as countermeasures against several types of side-channel attacks.

Figure 1:
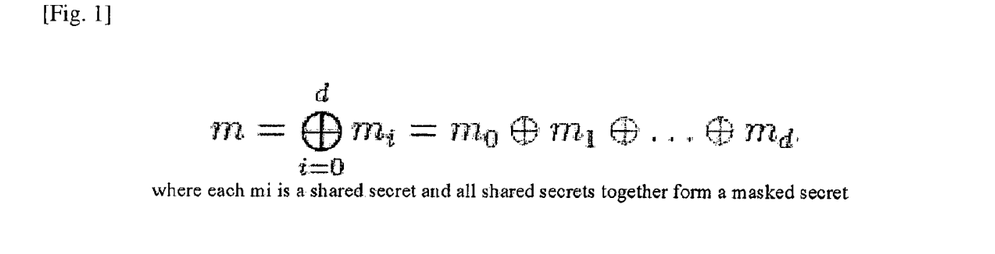
FIG. 1 illustrates an equation representing a masked state.
Figure 2:
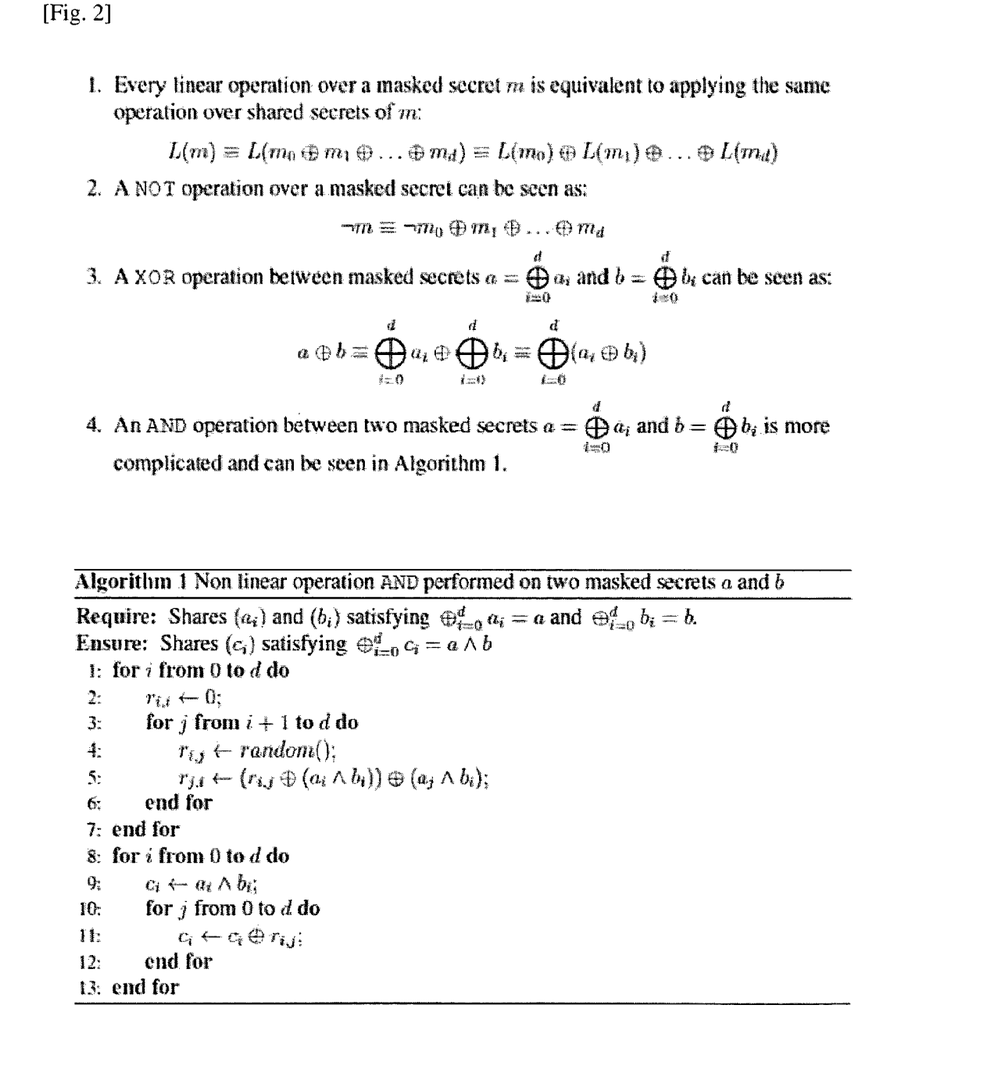
FIG. 2 illustrates ciphers employing operations in a finite field.

Masking is one of the most effective countermeasures against side-channel cryptanalysis. With regard to block ciphers, masking is intended to protect sensitive data, such as plaintext during encryption or cipher text during decryption. Because information computed in these processes will be later transformed into outputs of algorithms, all intermediary states must be protected at all times. A masked state m with d+1 shared secrets is represented by the equation in FIG. 1. From FIG. 1, observations can be made related to ciphers employing operations in finite field F2 as illustrated in FIG. 2.

These observations allow any algorithm employing binary field arithmetic to be implemented as masked. An important challenge in masked implementations can be seen in line 4 of the algorithm, in the form of random number generation. By considering that every share a, is a unity, every masked AND requires $((d+1)^2-(d+1))/2$ unities of random data and additional space of $(d+1)^2$ to store a matrix containing all possible combinations of shares.

LS-Designs were conceived to address side-channel threats by combining the advantages of bitsliced-capable ciphers with easy support to regular and masked software implementations. Algorithm 2 in FIG. 3 presents a generic specification for an LS-Design illustrating its simplicity and regularity. Instances of LS-Design cipher are characterized by the choice of bitsliced S-boxes S, an L-box matrix L acting as the diffusion layer, a number of rounds Nr and round constants C (r). Originally, two ciphers were instantiated and analyzed. The first cipher was Robin, a faster involutive instance, that later succumbed to invariant subspace attacks. The second cipher was Fantomas. A recent algorithm based on Fantomas is the SCREAM authenticated cipher.

Fantomas utilizes the 3/5-bit S-boxes from the 3-round MISTY cipher and is presented in detail in Algorithm 3 in FIG. 4. An important consideration is the number of AND operations in the choice of S-boxes. As previously discussed, masked implementations of the algorithm must rely on Algorithm 1 when computing ANDs. For security of the masking countermeasure, a lower bound on the number of ANDs is the size of the S-boxes.

Because Fantomas employs S-boxes of 8-bit granularity, the S-boxes must contain at least 8 AND operations to be appropriate for masking. There is some security margin in this design decision because Fantomas employs 11 AND operations between elements of the cipher state.

The emergence of the Internet of Things (IoT) raised concerns related to security of communications between IoT devices and even of the devices themselves. An extraordinary number of wirelessly networked devices that continuously store and exchange sensitive data exposes a larger attack surface, ranging from physical exposure and ease of access to remote availability, and made several attack scenarios practical, that had only been considered in research literature.

While designing and developing secure efficient implementations of cryptography is not a new problem and has been an active area of research since the birth of public-key cryptography, the emergence of IoT brings new challenges to this paradigm. Particularly, special attention must be given to side-channel attacks in which operational aspects of the implementation of a cryptographic algorithm may leak internal state information and allow an attacker to retrieve cryptography keys by only observing leakage through the communication channel as well as through power consumption, execution time or radiation measurements.

A fundamental security property for IoT is confidentiality of data exchanged between devices and sensors and is typically provided through symmetric encryption of traffic using block ciphers. There are numerous frameworks for designing block ciphers, but the recently introduced LS-Designs are a clear candidate for efficiency and side-channel resistance. Block ciphers based on LS-Designs are typically implemented with bitsliced S-boxes and table-based L-boxes stored in memory.

Therefore, there is a need for a protected implementation of the linear diffusion layer in such designs that provides resistance against side-channel attacks based on cache latency. One of the first well-known utilizations of the LS-Design construction is the Fantomas block cipher. The present invention provides several efficient, compact, portable and secure implementations of Fantomas with regard to side-channel resistance.

Various optimizations are provided to save execution time or code size and many are easily adaptable to other LS-Designs such as the CAESAR candidate SCREAMv3. Constant-time and masked implementations are described with regard to security. The constant-time implementation has been validated using the FlowTracker static analysis and protects execution against timing attacks and precomputed tables against cache latency attacks and the masked implementation addresses challenges of the research field. The constant-time implementation was tool.

DISCLOSURE OF INVENTION

Technical Problem

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method for performing secure communication between devices is provided. The method includes performing symmetric encryption of data by using block ciphers and transmitting the encrypted data via a communication channel where performing the symmetric encryption includes computing a linear layer of the block ciphers by representing the block ciphers as a vector-matrix multiplication over a binary field and accelerating the linear layer using online computation by evaluating multiple computations in parallel.

It is contemplated that evaluating the multiple computations in parallel includes computing per-bit multiplications via an AND operation and computing parity of result bit vectors in order to generate individual parity bits.

It is contemplated that evaluating the multiple computations in parallel further includes generating two dot matrices in parallel.

It is contemplated that evaluating the multiple computations in parallel further includes applying bitsliced S-boxes and choosing a line of a cipher state after the bitsliced S-boxes are applied.

It is contemplated that the chosen line of a cipher state represents a first hit vector and the method further includes multiplying the first bit vector by a diffusion matrix to generate a second bit vector.

It is contemplated that generating the two dot matrices includes computing two dot products of 16-bit vectors in parallel.

It is contemplated that generating the two dot matrices includes computing two dot products of 32-bit vectors in parallel.

It is contemplated that the block ciphers are based on LS-Designs.

It is contemplated that the block ciphers are Fantomas block cipher.

It is contemplated that the block ciphers are SCREAM authenticated cipher.

It is contemplated that accelerating the linear layer is performed without using precomputed tables.

It is contemplated that the devices are Internet of Things (IoT) devices.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Solution to Problem

In one embodiment, A method for performing secure communication between devices, the method comprising: performing symmetric encryption of data by using block ciphers; and transmitting the encrypted data via a communication channel, wherein performing the symmetric encryption comprises computing a linear layer of the block ciphers by representing the block ciphers as a vector-matrix multiplication over a binary field and accelerating the linear layer using online computation by evaluating multiple computations in parallel.

In another embodiment, wherein evaluating the multiple computations in parallel comprises: computing per-hit multiplications via an AND operation; and computing parity of result bit vectors in order to generate individual parity bits.

In another embodiment, wherein evaluating the multiple computations in parallel further comprises generating two dot matrices in parallel.

In another embodiment, wherein evaluating the multiple computations in parallel further comprises: applying bitsliced S-boxes; and choosing a line of a cipher state after the bitsliced S-boxes are applied.

In another embodiment, wherein the chosen line of a cipher state represents a first bit vector and further comprising multiplying the first bit vector by a diffusion matrix to generate a second hit vector.

In another embodiment, wherein generating the two dot matrices comprises computing two dot products of 16-bit vectors in parallel.

In another embodiment, wherein generating the two dot matrices comprises computing two dot products of 32-bit vectors in parallel.

In another embodiment, wherein the block ciphers are based on LS-Designs.

In another embodiment, wherein the block ciphers are Fantomas block cipher.

In another embodiment, wherein the block ciphers are SCREAM authenticated cipher.

In another embodiment, wherein accelerating the linear layer is performed without using precomputed tables.

In another embodiment, wherein devices are Internet of Things (IoT) devices.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3 illustrates an algorithm for a generic LS-Design;

FIG. 4 illustrates an algorithm for Fantomas;

BEST MODE FOR CARRYING OUT THE INVENTION

The present invention provides multiple implementations of the Fantomas block cipher. Portable implementations for both 32-bit and 64-bit processors are provided, specifically targeting ARM platforms, with additional code vectorized for SSE/NEON instructions.

32-Bit Implementation

Figure 5:
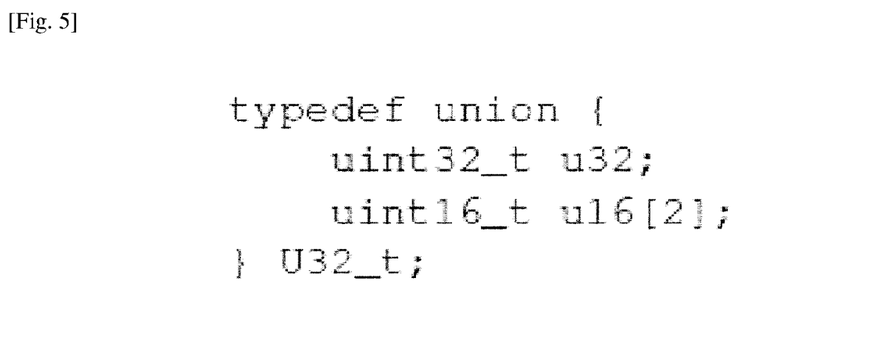
FIG. 5 illustrates representing internal state as a union combining pointers to the data types.

Two 32-bit variants of the cipher are implemented. The first is a constant-time version protected against timings attacks and the second is unprotected. Both versions require S/L-boxes which, operate over 16-bit chunks, and other operations over 32-bit data such as key addition. A portable and efficient implementation simultaneously supports the two data types in one concise structure. Following the C99 standard, representing the internal state as a union combining pointers to the data types as illustrated in FIG. 5 prevents breaking strict aliasing point rules.

The implementations still take aligned byte vectors as input and converts them to 32-bit pointers when needed. The S-boxes must then be computed using the union structure.

While some operations over 16-bit chunks could be combined in 32-bit operations, this is avoided to prevent unaligned loads and stores. Their bitsliced structure already provides the constant time property due to bitslicing. Therefore, no additional countermeasures are necessary for secure implementation of the substitution layer.

The diffusion layer is performance-critical and presents more obstacles to side-channel resistance since it is implemented through table lookups on the L-box. The unprotected version employs two 256-position half-word precomputed tables. The protected version implements the operation online by performing a vector-matrix binary multiplication in which two 16-bit words are simultaneously processed.

Figure 6:
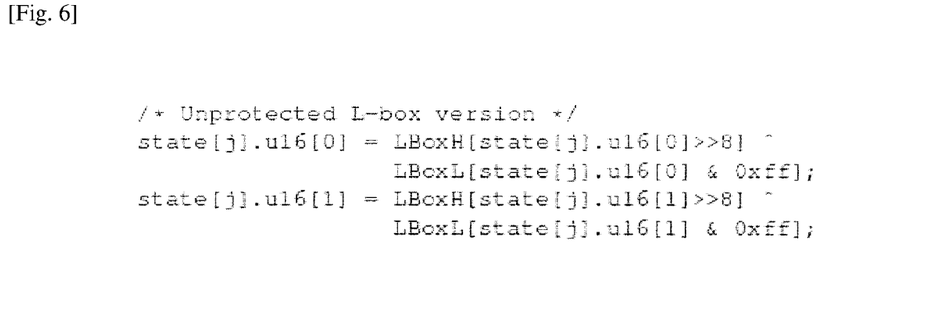
FIG. 6 illustrates a code portion illustrating unprotected L-box.

A small code portion illustrating the unprotected L-box is illustrated in FIG. 6 in which state stores the 128-bit state, LBoxH transforms the 8 most significant bits and LboxL transforms the 8 less significant bits for all j $\{0, 1, 2, 3\}$. The table lookups are vulnerable to adversarial influence over the memory hierarchy in processors equipped with cache memory.

Figure 7:
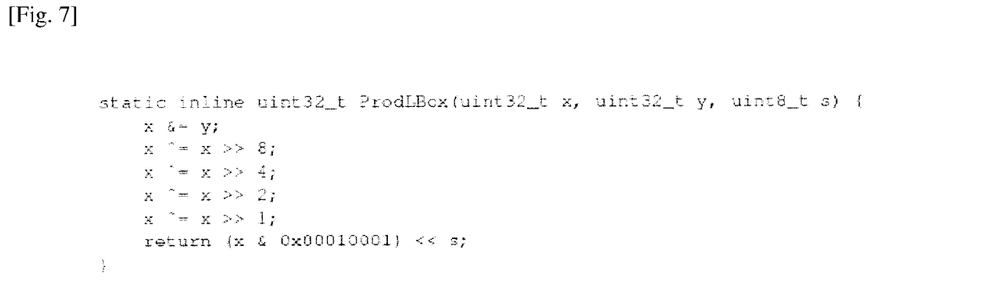
FIG. 7 illustrates a portion of an protected implementation.
Figure 8:
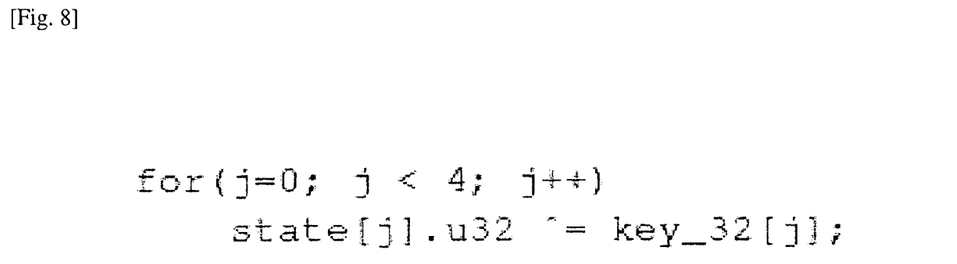
FIG. 8 illustrates a Fantomas 32-hit XOR operation.

FIG. 7 illustrates a portion of the protected implementation, which is more complex, in which x stores the 32 bits to be transformed by the L-box in 16-bit pairs and y contains the s-th duplicate line of the binary matrix representing linear transformation. This function multiplies the dot product of the two 32-bit vectors in F2, and calculates parity of each 16-bit result, processing two transformations at the same time. The key addition of Fantomas works by accumulating the key in the internal state using 32-bit XOR operations as illustrated in FIG. 8.

64-Bit Implementation

Two variants of the cipher are also implemented for 64-bit architectures. A modified union structure combines 16-bit and 64-bit words. The S-boxes must again be implemented over the union without breaking alignment and causing performance penalties. The unprotected L-box follows the same structure as the corresponding 32-bit implementation.

Function ProdLBox was transformed to operate over 64 bits with simple modifications to the input and output types and a duplicated bit mask 0x0001000100010001 in the last operation, thereby allowing computation of 4 simultaneous evaluations of the L-box. A 64-bit version is also implemented using the POPCNT instruction.

The present invention allows the linear layer of LS-Designs to be computed without leaking timing information through the cache latency side-channel. The LS-Design linear layer is represented as a vector-matrix multiplication over a binary field, and accelerated by precomputed tables, since binary field arithmetic is not natively supported in common processors. This invention replaces the precomputed tables with online computation, using a trick to evaluate several such computations in parallel. This way, the memory access pattern does not leak information anymore about what positions of the precomputed table are used at every iteration of the algorithm.

Figure 9:
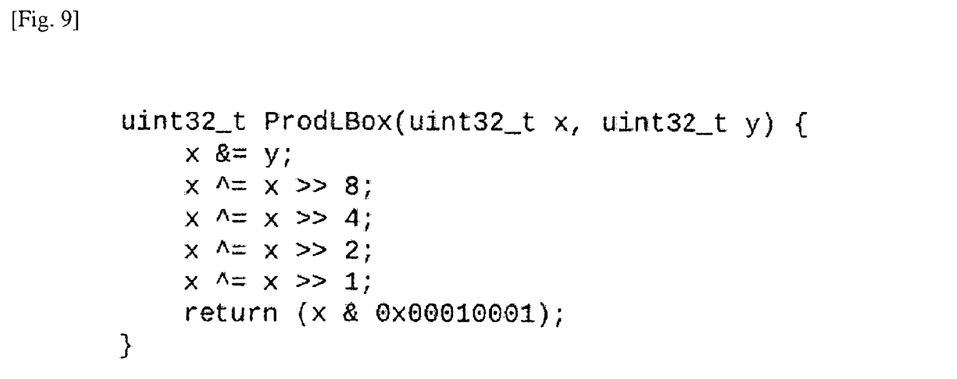
FIG. 9 illustrates code for a technique that computes two dot products of 16-bit vectors in parallel.

FIG. 9 illustrates code for a technique that computes two dot products of 16-bit vectors in parallel. The first line computes per-bit multiplications (AND operation) and the remaining lines compute the parity of the result bit vectors. The last line returns individual parity bits.

Figure 10:
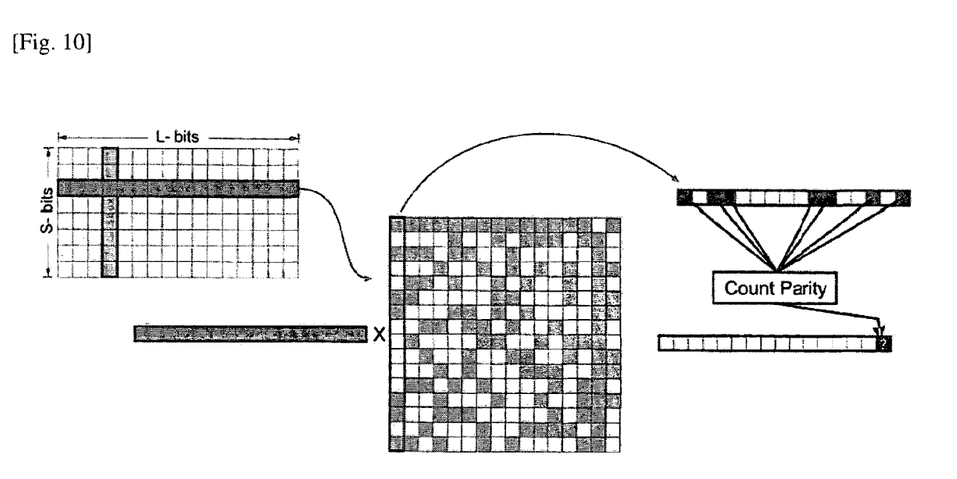
FIG. 10 illustrates a process for 16 bits with the LS-Design.

The process is illustrated for 16 bits with the LS-Design illustrated in FIG. 10. On the left of FIG. 10, a line of the cipher state is chosen immediately after the application of bitsliced S-boxes. This line represents a bit vector to be multiplied by the diffusion matrix, thereby resulting in another bit vector. The final bit consists of the parity of this bit vector.

The present invention facilitates efficient, portable, secure and compact implementations of LS-Designs with the Fantomas block cipher and SCREAM authenticated cipher. The implementations utilize a simple technique for storing internal states that allows simultaneously manipulation of data in both 16-bit and 32-bit granularity and to computing the linear layer of the ciphers in constant-time using vector-matrix multiplication over binary fields. The present invention mitigates side-channel leaks through cache latency due to non-uniform memory access patterns.

The present invention is applicable to Fantomas block cipher in resource-constrained ARM devices, such as the Cortex-M3 and Cortex-M4, as well as processors such as the ARM Cortex-A15 and modern Intel platforms. Implementations of the present invention provide a broad range of characteristics, such as 32-bit and 64-bit versions and side-channel resistant and vectorized code for NEON and SSE instructions.

The present invention provides substantial improvements over current systems with regard to both efficiency and compactness by utilizing novel algorithmic techniques and features specific to a target platform. Specifically, an unprotected 32-bit implementation achieves can increase speed by 35% to 66% in the ARM Cortex-M architecture, while requiring considerably less code size while a vectorized implementation improves performance by 40% in the ARM Cortex-A15 and 50% in the Core i7 Ivy Bridge for the implementations of block cipher.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for performing secure communication between devices, the method comprising:
   performing symmetric encryption of data by using block ciphers; and
   transmitting the encrypted data via a communication channel,
   wherein performing the symmetric encryption comprises computing a linear layer of the block ciphers by representing the block ciphers as a vector-matrix multiplication over a binary field and accelerating the linear layer using online computation by evaluating multiple computations in parallel,
   wherein evaluating the multiple computations in parallel comprises:
   computing per-bit multiplications via an AND operation; and
   computing parity of result bit vectors in order to generate individual parity bits.

2. The method of claim 1, wherein evaluating the multiple computations in parallel further comprises generating two dot matrices in parallel.

3. The method of claim 2, wherein evaluating the multiple computations in parallel further comprises:
   applying bitsliced S-boxes; and
   choosing a line of a cipher state after the bitsliced S-boxes are applied.

4. The method of claim 3, wherein the chosen line of a cipher state represents a first bit vector and further comprising multiplying the first bit vector by a diffusion matrix to generate a second bit vector.

5. The method of claim 2, wherein generating the two dot matrices comprises computing two dot products of 16-bit vectors in parallel.

6. The method of claim 2, wherein generating the two dot matrices comprises computing two dot products of 32-bit vectors in parallel.

7. The method of claim 1, wherein the block ciphers are based on LS-Designs.

8. The method of claim 7, wherein the block ciphers are Fantomas block cipher.

9. The method of claim 7, wherein the block ciphers are SCREAM authenticated cipher.

10. The method of claim 1, wherein accelerating the linear layer is performed without using precomputed tables.

11. The method of claim 1, wherein devices are Internet of Things (IoT) devices.

* * * * *